United States Patent [19]

Monacelli

[11] 4,418,181

[45] Nov. 29, 1983

[54] POLYIMIDES HAVING BIS-MALEIMIDE TERMINAL GROUPS

[75] Inventor: Walter J. Monacelli, St. Petersburg, Fla.

[73] Assignee: Plastics Engineering Company, Sheboygan, Wis.

[21] Appl. No.: 267,379

[22] Filed: May 26, 1981

[51] Int. Cl.$^3$ .................... C08G 73/10; C08G 73/12
[52] U.S. Cl. ................... 525/426; 525/432;
525/436; 526/259; 526/261; 526/262; 528/322;
528/331; 528/350; 528/351; 528/352; 528/353;
528/125; 528/126; 528/128; 528/170; 528/183;
528/184; 528/185; 528/208; 528/220; 528/226;
528/229; 528/321; 544/198; 548/521; 562/433;
562/465; 562/598
[58] Field of Search .............. 528/170, 321, 322, 125,
528/126, 128, 220, 229, 183, 184–185, 208, 326,
331, 350–353; 526/259, 261, 262; 525/426, 432,
436; 544/198; 548/521; 562/433, 565, 598

[56] References Cited

U.S. PATENT DOCUMENTS

| | | | |
|---|---|---|---|
| 3,575,924 | 4/1971 | Bargain | 528/170 |
| 4,187,364 | 2/1980 | Darms et al. | 528/170 |
| 4,189,560 | 2/1980 | Roth et al. | 528/170 |
| 4,220,741 | 9/1980 | Renner et al. | 528/170 |
| 4,225,497 | 9/1980 | Baudouin et al. | 528/170 |
| 4,266,047 | 5/1981 | Jablonski et al. | 528/170 |
| 4,280,946 | 7/1981 | Darms et al. | 528/170 |
| 4,283,522 | 8/1981 | Takahashi et al. | 528/170 |
| 4,321,198 | 3/1982 | D'Alelio et al. | 528/170 |

*Primary Examiner*—Lester L. Lee
*Attorney, Agent, or Firm*—Walter J. Monacelli

[57] ABSTRACT

The compositions described herein comprise polyimides having bis-maleimide terminal groups and having the formula:

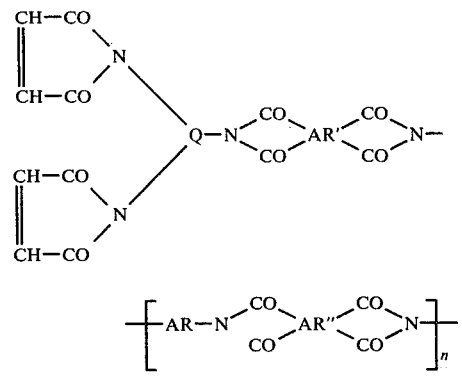

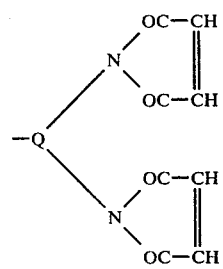

wherein Q is a trivalent aromatic radical, Ar is a divalent aromatic radical, Ar" is a tetravalent aromatic radical and n has a value of 0–20. Derivatives may be made of these compounds by homopolymerization, copolymerization with other copolymerizable materials and by reaction with Diels-Alder reactable materials.

27 Claims, No Drawings

POLYIMIDES HAVING BIS-MALEIMIDE TERMINAL GROUPS

BACKGROUND OF THE INVENTION

1. Field of the Invention

This invention relates to polyimides having terminal bis-maleimide groups or tetramaleimide polyimides. More specifically it relates to such compounds in which the bis-maleimide groups are derived from triamino aromatic compounds. Still more specifically, a preferred bis-maleimide group is one derived from a triamine compound in which each amino group is attached to a different benzenoid ring in the aromatic nucleus.

2. State of the Prior Art

Bis-maleimides are known, as described in British Pat. No. 1,280,846. Moreover, D'Alelio, U.S. Pat. Nos. 3,890,272 and 3,929,713 describe linear polyimides having terminal mono-maleimide groups thereby comprising bis-maleimides with the maleimide groups connected by the intermediate linear polyimide.

However, while it is contemplated that the polyimides having bis-maleimide terminal groups would have at least a 50 percent increase in reactivity due to the additional maleimide groups, no tetra-maleimide polyimide compositions have been found.

SUMMARY OF THE INVENTION

In accordance with the present invention, tetra-maleimide polyimide compounds have now been found which are represented by the formula:

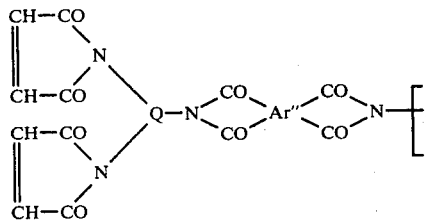

wherein Q is a trivalent aromatic radical, Ar is a divalent aromatic radical, Ar" is a tetravalent aromatic radical and n is zero or an integer having a value of 1–20.

These compositions are referred to as tetramaleimide polyimides because they have at least four maleimide groups, two at each terminal. However, there may be additional maleimide groups in the interior structure of the polyimide where a triamine has been used with two of the amine groups used in the polyimide structure and the third amine group used for the formation of a maleimide group.

These tetra-maleimide compounds may be polymerized, copolymerized with numerous copolymerizable compounds and reacted with various compounds capable of undergoing the Diels-Alder reaction to produce various derivative products suitable for many uses.

The tetra-maleimides may be prepared by ambient or raised temperature reaction of the appropriate triamine with two equivalents of maleic anhydride. Then the resultant diamic acid amine is reacted with appropriate amounts of an aromatic diamine and of an aromatic tetracarboxylic acid dianhydride to form the intermediate polyamic acid structure of the polyimide. Then the amic acid structures of both the terminal and the interior groups are cyclized to convert them to the imide structure.

A preferred procedure and conditions for the ring closing are described in U.S. Pat. No. 2,444,536 where acetic anhydride and sodium acetate are used to promote the ring closure. Ring closure of the amic acid intermediate is effected in the presence of an excess over stoichiometric amount of an anhydride of a monocarboxylic fatty acid of 2–5 carbon atoms, preferably acetic anhydride, at a temperature of 60°–100° C., and in the presence of an anhydrous alkali metal salt, preferably sodium, of such a carboxylic acid. The salt is advantageously present in an amount of 5–20% of the weight of the anhydride and the anhydride is present in an amount of 1–4 times the molar equivalent of amic acid.

The original reaction of the maleic anhydride with the triamine is represented as:

(Reaction 1)

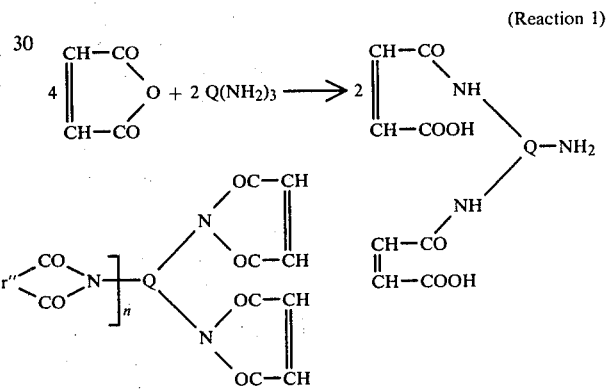

Then n moles of an aromatic diamine and n+1 moles of an aromatic tetracarboxylic acid dianhydride are added to the above two moles of the maleic amic acid amine intermediate and reacted as follows to give additional intermediate amic acid groups:

(Reaction 2)

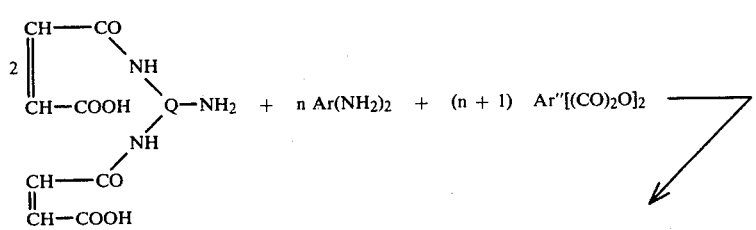

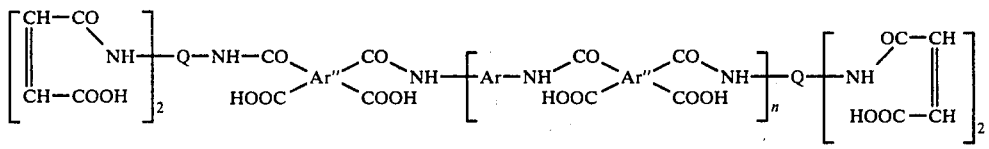

Then acetic acid anhydride is added in an amount of 1-4 equivalents per amic acid group and sodium acetate, in an amount of 5-20% of the weight of acetic anhydride, and reaction continued at 60°-100° C. to effect ring closure to give:

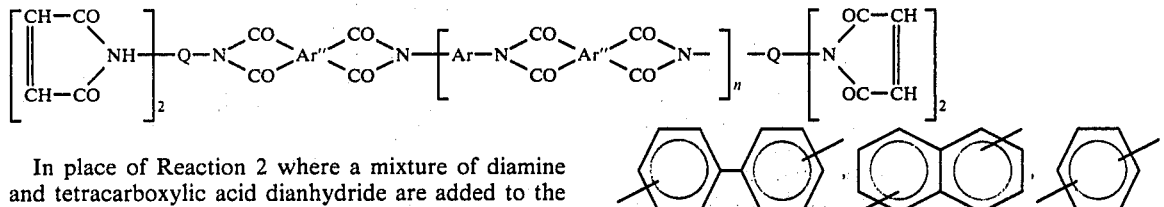

In place of Reaction 2 where a mixture of diamine and tetracarboxylic acid dianhydride are added to the di(maleic amic acid) derivative of the triamine, there may be instead added a preformed intermediate in which the diamine and tetracarboxylic acid anhydride are prereacted either to the polyimide structure or to the polyamic acid stage, in both of which intermediates there are terminal anhydride groups with which the di(maleic amic acid) derivative of the triamine may be reacted through the remaining amine group. Then the respective amic acid groups are cyclized to give the imide structure. In the case of the polyamic acid intermediate, the amic acid groups in both the intermediate and in the terminal amic acid groups are simultaneously cyclized to the imide ring structure.

When a triamine is reacted with two molar equivalents of maleic anhydride to form the di(maleic amic acid) derivative of the triamine, the exact positions of the two maleic amic acid groups are not identified and the product, in fact, is believed to be a mixture of derivatives in which the maleic amic acid groups may be on different N groups in the triamine. Therefore the unreacted N group which is available for subsequent reaction with an anhydride group may vary in position in the various intermediates. Thus if a particular triamine is represented in a formula as having a particular arrangement of attachments to the nitrogen atoms, then it is contemplated that other arrangements of attachments may also be present. For example, with 2,4-bis(p-aminobenzyl)aniline the derivative groups may be represented as

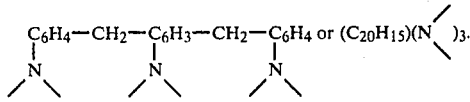

Therefore in the generic formulas given above, the residue of 2,4-bis(p-aminobenzyl)aniline as represented by Q may be given as $C_{20}H_{15}-$.

The divalent aromatic radical Ar and the trivalent radical Q are preferably hydrocarbon but can contain additional groups which will not interfere with the various reactions involved in the preparation and use of tetra-maleimide products.

Ar is a divalent benzenoid radical advantageously selected from the group consisting of

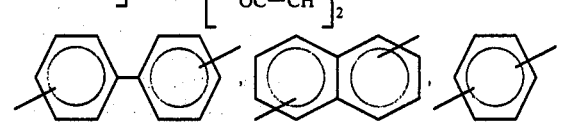

and multiples thereof connected to each other by R, for example:

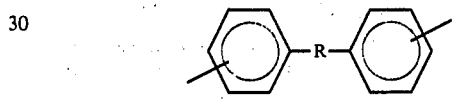

wherein R is an alkylene chain of 1-3 carbon atoms, $-CH=CH-$, or

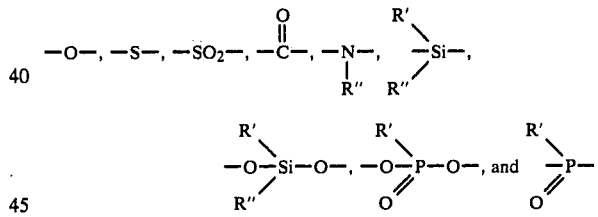

wherein R' and R" are each selected from the group consisting of alkyl and aryl of 1 to 7 carbon atoms. Ar is preferably:

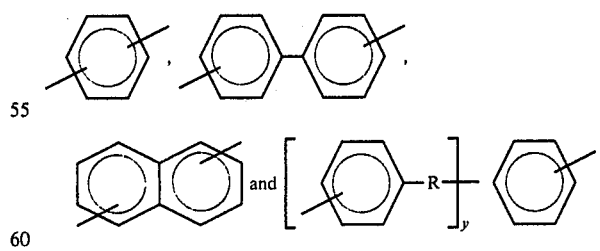

where R is

$-O-$, $-S-$, $-CH=CH-$, $-CH_2-$, $-SO_2-$, and y is 1 to 3. Particularly preferred is the

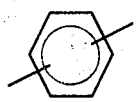

radical.

The trivalent Q radical can have the same basic structure as the Ar radical except that it has a third valency attached to a benzoid ring therein. Preferred Q radicals are

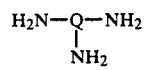

and preferably one having three separate interconnected benzenoid rings in which the N atoms of each respective maleimide group is attached to a different benzenoid ring.

The trivalent Q radical is advantageously derived by reacting aromatic triamines with maleic anhydride. These aromatic triamines have the formula:

$$H_2N-Q-NH_2$$
$$|$$
$$NH_2$$

In the above formula, Q represents a trivalent aromatic radical which, in turn, for the purpose of this application, is defined as preferably containing at least one 6-membered ring containing benzenoid unsaturation. Where Q contains two or more 6-membered rings, the rings can be joined by sharing a common pair of carbon atoms, e.g., as in a naphthyl grouping, or by being joined by a valence bond, e.g., as in a biphenyl grouping, or by a linking carbon, oxygen, or sulfur atom. The ring preferably will contain only carbon atoms, but also may contain up to three nitrogen atoms. Examples of suitable nitrogen-containing rings include azine rings, diazine rings (1,2 or 1,3 or 1,4 rings) and the various isomeric triazine rings. Examples of suitable amines of this class include the isomeric tri(amino) substituted benzenes, toluenes and xylenes, the tri(amino) substituted naphthalenes and biphenyls, and the like. The preferred aromatic triamine is 2,4-bis-(p-aminobenzyl)aniline. Examples of triamines in which the aromatic ring contains one or more nitrogen atoms include 2,4,6-triamino-1,3,5-triazine (melamine).

A particularly preferred bis-maleic acid amide used as intermediate in the preparation of the tetra-maleimide polyimides is one having the general formula:

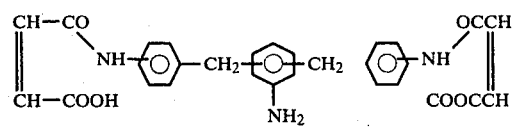

An especially preferred bis-maleic amide acid is that derived from the commercially available 2,4-bis(p-aminobenzyl) aniline. This bis-maleic amide acid has the formula:

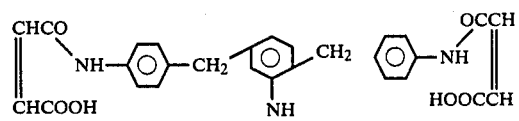

The tetra-maleimide polyimides may be further polymerized readily by heat alone, or by the action of free radical initiators, or by the addition of aromatic polyamines as bridging agents, or preferably by the presence of a catalytic amount (0.01 to 5% by weight) of an alkali metal salt of a Bronsted acid which can include small amounts of activator as described in D'Alelio U.S. Pat. No. 3,929,715.

In addition to homopolymerization, the tetra-maleimide polyimides may be copolymerized with various vinyl monomers such as styrene, acrylonitrile, acrylates and methacrylates, etc., with monomaleimides and with dimaleimides including bis-maleimide-terminated polyimides as described more fully in U.S. Pat. No. 3,929,713. Such copolymerizations may be initiated by free radical generating materials such as peroxides, azo compounds, etc. as are well known in the polymerization art. In such copolymerizations, compositions of 5–95% by weight of the tetra-maleimide polyimide and 95–5% of the comonomer are advantageous. Moreover, these tetra-maleimide polyimides may be reacted with Diels-Alder reactable materials and where these are difunctional, polymers may be produced by such reactions.

Polymerization of the tetra-maleimide polyimides of this invention occur through the double bonds of the maleimide group to give the following structure, where Ar' represents the central core:

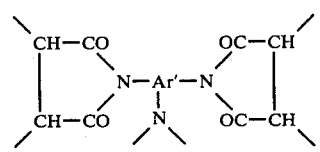

The crosslinked density of polymerization products of these tetra-maleimides is much greater because of the four bonds at each end of the polyimide as shown above which totals at least 8 bonds, which contrasts favorably with the crosslink density of bis-maleimides which produce four valence bonds.

Copolymerization may be effected with monomaleimides and bis-maleimides such as the bis-maleimides in which the maleimide groups are attached as terminal groups to a polyimide core as shown in U.S. Pat. Nos. 3,890,272 and 3,929,713 having the formula:

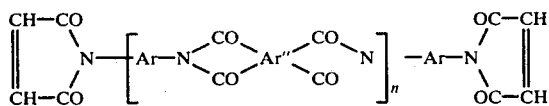

wherein Ar is as defined above, Ar" is a tetravalent aromatic radical having a basic structure similar to those described above for Ar and Q, and n is zero or an integer having a value of 1–20.

Monomaleimides that may be copolymerized are represented by the formula

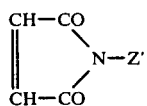

wherein Z' is a monovalent radical, preferably hydrocarbon radical of 1–20 carbon atoms, such as aryl, alkyl, alkenyl, cycloalkyl, cycloalkenyl, alkoxyalkyl, alkoxyaryl, alkoxycycloalkyl, aryloxyalkyl, etc. or combinations of such groups.

Dimaleimides that may be copolymerized are represented by the formula

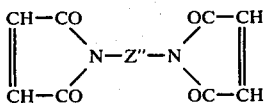

wherein Z" is a divalent organic radical, preferably hydrocarbon radical, such as aromatic, aliphatic or cyaliphatic or combinations of these, or multiplicity of such groups joined by —O—, —S— or —SO$_2$— as connecting groups, for example —C$_6$H$_4$—, —C$_6$H$_3$(CH$_3$)—, —C$_{10}$H$_6$—, —CH$_2$—, —(CH$_2$)$_2$—, —(CH$_2$)$_4$—, —CH$_2$CHCH$_3$, CH$_3$CHCHCH$_3$, —C$_6$H$_{10}$—, —C$_6$H$_9$(CH$_3$)—, —C$_6$H$_4$OC$_6$H$_4$—, —C$_6$H$_4$—C$_6$H$_4$—, —CH$_2$CH$_2$OCH$_2$CH$_2$—, —C$_6$H$_4$SC$_6$H$_4$—, —C$_6$H$_4$SO$_2$C$_6$H$_4$—, —C$_6$H$_4$CH$_2$CH$_2$—, —C$_6$H$_4$SCH$_2$CH$_2$—, —C$_6$H$_4$OCH$_2$CH(CH$_3$)—, etc.

Other dimaleimides which may be copolymerized with the tris-maleimides of this invention are the maleimide-terminated polyimides shown in D'Alelio U.S. Pat. No. 3,929,713. The polyimide portion of these compositions are prepared by a combination of an aromatic diamine and the dianhydride of an aromatic tetracarboxylic acid as in the preparation of the tetramaleimide polyimides of this invention.

These maleimide-terminated polyimides are represented by the formula:

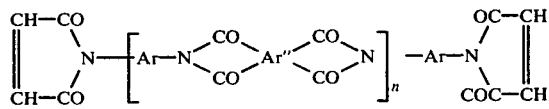

wherein Ar, Ar" and n are as defined herein above.

In preparing the polyimide portion of the tetra-maleimide polyimides of this invention, the tetravalent aromatic radical Ar" has its valencies attached directly to separate carbon atoms of the aromatic radical and each pair of valencies is attached either to adjacent carbon atoms or to peri carbon atoms in the aromatic radical. They are advantageously derived from aromatic dianhydrides in which the four carbonyl groups are attached directly to separate carbon atoms of said aromatic radical and in each pair the carbonyl groups are attached to adjacent carbon atoms in Ar' except that in the case of Ar" being a naphthalene radical, one or both pairs of the carbonyl groups may be attached to peri-carbon atoms.

Examples of aromatic diamines which are suitable to provide the divalent Ar radicals include 4,4'-diaminodiphenyl propane, 4,4'-diamino-diphenyl methane, benzidine, 3,3'-dichlorobenzidene, 4,4'-diaminodiphenyl sulfide, 3,3'-diamino-diphenyl sulfone, 4,4'-diamino-diphenyl sulfone, 4,4'-diamino-diphenyl ether, 1,5-diamino naphthalene, 4,4'-diamino-diphenyl diethylsilane, 4,4'-diamino-diphenyl diphenylsilane, 4,4'-diamino-diphenyl ethyl phosphine oxide, 4,4'diaminodiphenyl phenyl phosphine oxide, 4,4'-diamino-diphenyl N-methyl amine, 4,4'-diamino-diphenyl N-phenyl amine and mixtures thereof, 3,3'-dimethyl-4,4'-diaminodiphenylmethane, 3,3'-diethyl-4,4'-diaminodiphenylmethane, 3,3'dimethoxy-4,4'-diaminodiphenylmethane, 3,3'-diethoxy-4,4'-diaminodiphenylmethane, 3,3'-dichloro-4,4',4,4'-diaminodiphenylmethane, 3,3'-dibromo-4,4'-diaminodiphenylmethane, 3,3'-dicarboxy-4,4'-diaminophenylmethane, 3,3'-dihydroxy-4,4'diaminophenylmethane, 3,3'-disulpho-4,4'-diaminodiphenylmethane, 3,3'-dimethyl-4,4'-diaminodiphenylether, 3,3'-diethyl-4,4'-diaminodiphenylether, 3,3'-dimethoxy-4,4'-diaminodiphenylether, 3,3'-dibromo-4,4'-diamino diphenylether, 3,3'-dicarboxy-4,4'-diaminodiphenylether, 3,3'-dihydroxy-4,4'-diaminodiphenylether, 3,3'-disulfo-4,4'-diaminodiphenylether, 3,3'-dimethyl-4,4'-diaminodiphenylsulfide, 3,3'-diethyl-4,4'-diaminodiphenylsulfide, 3,3'-dimethoxy-4,4'-diaminodiphenylsulfide, 3,3'-diethoxy-4,4'-diaminodiphenylsulfide, 3,3'-dichloro-4,4'-diaminodiphenylsulfide, 3,3'-dibromo-4,4'-diaminodiphenylsulfide, 3,3'-dicarboxyl-4,4'-diaminodiphenylsulfide, 3,3'-dihydroxy-4,4'-diaminodiphenylsulfide, 3,3'-disulfo-4,4'-diaminodiphenylsulfide, 3,3'-dimethyl-4,4'-diaminodiphenylsulfone, 3,3'-diethoxy-4,4'-diaminodiphenylsulfone, 3,3'-dichloro-4,4'-diaminodiphenylsulfone, 3,3'-dicarboxy-4,4'-diaminodiphenylsulfone, 3,3'-dihydroxy-4,4'-diaminodiphenylsulfone, 3,3'-disulfo-4,4'-diaminodiphenylsulfone, 3,3'-diethyl-4,4'-diaminodiphenylpropane, 3,3'-dimethoxy-4,4'-diaminodiphenylpropane, 3,3'-dichloro-4,4'-diaminodiphenylpropane, 3,3'-dicarboxy-4,4'-diaminodiphenylpropane, 3,3'-dihydroxy-4,4'-diaminodiphenylpropane, 3,3'-disulfo-4,4'-diaminodiphenylpropane, 3,3'-dimethyl-4,4'-diaminobenzophenone, 3,3'-dimethoxy-4,4'-diaminobenzophenone, 3,3'-dichloro-4,4'-diaminobenzophenone, 3,3'-dibromo-4,4'-diaminobenzophenone, 3,3'-dicarboxy-4,4'-diaminobenzophenone, 3,3'-dihydroxy-4,4'-diaminobenzophenone, 3,3'-disulphodiaminobenzophenone, 3,3'-diaminodiphenylmethane, 3,3'-diaminodiphenylether, 3,3'-diaminodiphenylsulfide, 3,3'-diaminodiphenylsulfone, 3,3'-diaminodiphenylpropane, 3,3'-diaminobenzophenone, 2,4-diaminotoluene, 2,6-diaminotoluene, 1-isopropyl-2,4-phenylenediamine, 2,4-diaminoanisole, 2,4-diaminomonochlorobenzene, 2,4-diaminofluorobenzene, 2,4-diaminobenzoic acid, 2,4-diaminophenol and 2,4-diaminobenzenesulfonic acid, and phenylene diamines. Preferred diamines are 4,4'-oxydianiline, 4,4'-sulfonyldianiline, 4,4'-methylene dianiline, 4,4'-diaminobenzophenone, 4,4'-diaminostilbene and the phenylene diamines, 2,4-diaminotoluene and all the meta and para isomers of $H_2NC_6H_4OC_6H_4OC_6H_4NH_2$.

Useful dianhydrides for providing the tetravalent Ar" radical include 3,3',4,4'-benzophenonetetra-carboxylic acid dianhydride, pyromellitic dianhydride, 2,3,6,7-naphthalene tetracarboxylic acid dianhydride, 3,3',4,4'-diphenyl tetracarboxylic acid dianhydride, 1,2,5,6-naphthalene tetracarboxylic acid dianhydride, 2,2',3,3'-diphenyl tetracarboxylic acid dianhydride, 2,2-bis(3,4-dicarboxyphenyl)propane dianhydride, 3,4,9,10-perylene tetracarboxylic acid dianhydride, bis(3,4-dicarboxyphenyl)ether dianhydride, naphthalene-1,2,4,5-tetracarboxylic acid dianhydride, naphthalene-1,4,5,8-tetracarboxylic acid dianhydride, decahydronaphthalene-1,4,5,8-tetracarboxylic acid dianhydride, 4,8-dimethyl-1,2,3,5,6,7-hexahydronaphthalene-1,2,5,6,-tetracarboxylic acid dianhydride, 2,6-dichloronaphthalene-1,4,5,8-tetracarboxylic acid dianhydride, 2,7-dichloronaphthalene-1,4,58-tetracarboxylic acid dianhydride, 2,3,6,7-tetrachloronaphthalene-1,4,5,8-tetracarboxylic acid dianhydride, phenathrene-1,8,9,10-tetracarboxylic acid dianydride, cyclopentane-1,2,3,4-tetracarboxylic acid dianhydride, pyrrolidine-2,3,4,5-tetracarboxylic acid dianhydride, pyrazine-2,3,5,6-tetracarboxylic acid dianhydride, 1,1-bis(2,3-dicarboxyphenyl)ethane dianhydride, 1,1-bis(3,4-dicarboxyphenyl)ethane dianhydride, bis(3,4-dicarboxyphenyl)methane dianhydride, bis(3,4-dicarboxyphenyl)-sulfone dianhydride, benzene-1,2,3,4-tetracarboxylic acid dianhydride and thiophene-2,3,4,5-tetracarboxylic acid dianhydride. Preferred Ar" radicals are:

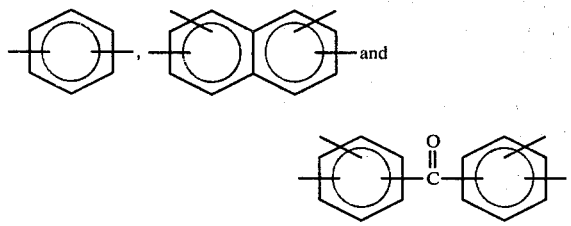

The tetra-maleimides of this invention may also be cured by adding 0.01 to 5%, preferably 1 to 5% based on the weight of the tetra-maleimide, of an alkali metal salt of a Bronsted acid. The Bronsted acid salt catalyst used is an alkali metal (Na, K and Li) salt of an organic Bronsted acid having a $pk_a$ in the range of about 4 to 6, an alkali metal (NA, K and Li) cyanide or an alkali metal (Na, K and Li) carbonate. A preferred catalyst is a neutralized alkali metal salt of a monocarboxylic acid or dicarboxylic acid.

The alkali metal salt catalysts are particularly effective in curing at lower temperatures. The catalyst is most preferably an alkali metal (usually sodium or potassium) salt of a monocarboxylic acid or dicarboxylic acid having 2 to 12 carbon atoms, such as acetic acid, propionic acid and butyric acid. While the higher molecular weight monocarboxylic acids are not preferred, they are useful because of their solubility in organic solvents. Other useful catalysts are alkali neutralized dicarboxylic acids such as oxalic acid, malonic acid, succinic acid, glutaric acid, adipic acid, maleic acid, fumaric acid, itaconic acid, glutaconic acid. Sodium acetate and disodium maleate are preferred catalysts.

Representative organic Bronsted acids and their appropriate $pk_a$ values are as follows:

| Organic Acid | $pk_a$ |
|---|---|
| Acetic | 4.75 |
| Propionic | 4.87 |
| Butyric | 4.81 |
| i-Butyric | 4.84 |
| Heptanoic | 4.89 |
| Glutaric (2) | 5.41 |
| Fumaric | 4.44 |
| Benzoic | 4.19 |
| Succinic (1) | 4.16 |
| Ethylbenzoic | 4.35 |
| Ethylphenylacetic | 4.37 |
| Adipic | 4.43 |
| Ascorbic | 4.10 |
| Gamma chlorobutyric | 4.00 |
| Maleic (2) | 6.07 |
| Malic (2) | 5.11 |
| m-methylcinnamic | 4.44 |
| o-phthalic | 5.51 |
| m-phthalic | 4.60 |
| p-phthalic | 4.82 |
| Oxalic | 4.19 |
| Malonic (2) | 5.69 |

In addition to the catalyst, it is preferred that the curable solid product contains a catalyst activating amount of an aprotic organic compound as described herein as an activator for the catalyst. This activator can be used at any useful concentration but ordinarily a concentration of 0.01 to 5%, based on the weight of product, is sufficient with about 1 to 5% being preferred.

In conducting polymerizations various solvents may be used with the tetra-maleimide polyimides. The particular solvent used will depend on the specific tetra-maleimide polyimide used. In most cases, the solvent is an aprotic organic compound having a dielectric constant between 35 and 45, preferably one which is water soluble. Representative aprotic compounds are N,N-dimethylformamide, N,N-diethylformamide, N,N-dimethylmethoxyacetamide, N-methyl caprolactam, caprolactam, N,N-dimethylacetamide, N,N-diethylacetamide, dimethyl sulfoxide, N-methyl-α-pyrrolidone, tetramethylurea, hexamethylphosphoramide, tetramethylene sulfone, N,N,N',N'-tetramethyl-α-ethylmalonamide, N,N,N',N'-tetramethylglutaramide, N,N,N',N'-tetramethylsuccinamide, thiobis(N,N-dimethylacetamide), bis(N,N-dimethylcarbamylmethyl)ether, N,N,N',N'-tetramethylfuraramide methylsuccinonitrile, N,N-dimethylcyanoacetamide, N,N-dimethyl-β-cyano-propionamide, N-formylpiperidine and butyrolactone, etc.

Of the solvents, dimethylacetamide is most preferred. Other preferred solvents are dimethylformamide, N-methyl pyrrolidone, dimethyl sulfoxide, butyrolactone and caprolactam.

In many cases, non-aprotic solvents can be used. For example, xylene, phenol, anisole, benzonitrile, acetophenone, methylphenylether or mixtures of these with each other, the aprotic solvents or with relatively poor solvents such as benzene, toluene cyclohexane, cyclohexene, dioxane, butyl cellosolve and the like.

The concentration of the tetra-maleimide in the solvent can be in the range of 1 to 80% by weight of imide and solvent depending on the tetra-maleimide, the solvent and the temperature used. Preferably, the concentration is between 10 and 60% by weight.

The tetramaleimide polyimides of this invention are also capable of participating in a Diels-Alder type of addition with compounds containing a donor function such as —C≡C—C≡C—, —C≡C—CH=CH—, etc. such as the diactylene-terminated polyimides and vinylacteylene-terminated polyimides disclosed in copending applications Ser. Nos. 199,604 and 199,616, both filed Oct. 22, 1980, as well as various other compositions having conjugated diacetylene, conjugated vinylacetylene, conjugated diene and other Diels-Alder donor functions, such as $C_6H_5$—C≡C—C≡CH, $C_6H_5$—C≡C—CH=CH$_2$, $C_6H_5$—CH=CH—CH=CH$_2$, $C_6H_5$—C≡C—C≡C—$C_6H_5$, $C_6H_5$—CH=CH—CH=CH—CH$_3$, $C_6H_5CH_2$C≡C—C≡CCH$_2C_6H_5$, $CH_3$C≡C—C≡C—CH$_3$, $C_6H_{11}$—C≡C—C≡C—$C_6H_{11}$, $C_2H_5$C≡C—C≡CC$_2H_5$, etc.

The abovementioned diacetylene-terminated and vinylacetylene-terminated polyimides may be represented by the formula:

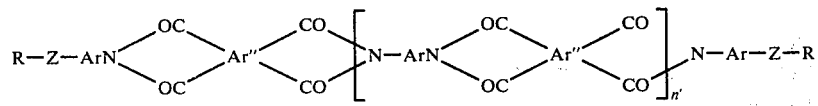

wherein:
Ar″ is a tetravalent aromatic radical as defined above;
Ar is a divalent aromatic radical as defined above;
n′ is zero or an integer having a value of at least one, preferably 1–20.
R″ is hydrogen or an organic moiety containing one to 21 carbon atoms; and
Z is the structure —C≡C—C≡C—, —C≡C—CH=CH— or —CH=CH—C≡C—.

In the Diels-Alder reactions between maleimide groups and groups having conjugated unsaturation, the resulting structure may be represented as follows:

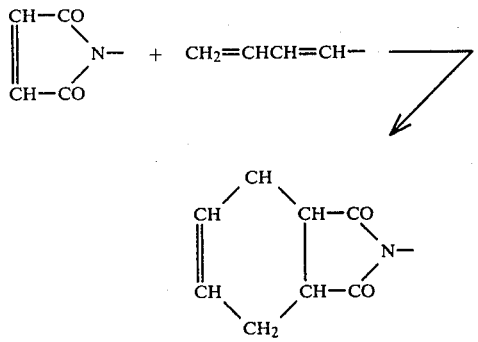

Where one or both of the structures are in polymer molecules, the above reaction results in increases in polymer length, either by increase in linear chain length or by crosslinking. Similar structures are effected with conjugated diacetylene and vinyl acetylene groups except that the resulting ring structures have correspondingly greater unsaturation because of the acetylene groups.

The R groups may include any organic moiety that will not interfere with the functions of the polyimides as described herein. Preferably these groups are hydrocarbon or a multiplicity of hydrocarbon groups joined by ether, sulfite, ester and sulfonyl groups such as —O—, —S—, —COO—, —OOC—, —S(O)$_2$—, etc.

Typical R groups suitable in the above formulas include: —CH$_3$, —C$_2$H$_5$, —C$_3$H$_7$, —C$_4$H$_9$, —C$_6$H$_{13}$, —C$_{10}$H$_{21}$, —C$_{18}$H$_{37}$, —C$_6$H$_{11}$, —C$_5$H$_9$, —C$_5$H$_8$CH$_3$, —C$_6$H$_{10}$C$_2$H$_5$, —CH$_2$C$_6$H$_{11}$, —CH$_2$CH$_2$C$_6$H$_{11}$, —C$_6$H$_5$, —C$_6$H$_4$CH$_3$, —C$_6$H$_4$C$_3$H$_7$, —C$_6$H$_3$(CH$_3$)$_2$, —C$_6$H$_5$OCH$_3$, —C$_6$H$_4$OC$_2$H$_5$, —C$_6$H$_4$OOCCH$_3$, —C$_6$H$_4$SO$_2$C$_6$H$_5$, —C$_6$H$_4$SO$_2$C$_6$H$_4$CH$_3$, —C$_6$H$_4$SO$_2$C$_6$H$_5$, —C$_6$H$_3$(CH$_3$)OC$_3$H$_7$, —C$_6$H$_4$OC$_6$H$_4$CH$_3$, —C$_{10}$H$_8$, —C$_{10}$H$_7$CH$_3$, —C$_{10}$H$_7$C$_2$H$_5$, —C$_{10}$H$_6$(CH$_3$)$_2$, —C$_{10}$H$_6$OCH$_3$, —C$_{10}$H$_6$OOCCH$_3$, —(C$_6$H$_4$)$_3$C$_3$H$_7$, —(C$_6$H$_4$)$_3$OC$_4$H$_9$, —(C$_6$H$_4$)$_3$OC$_6$H$_5$, —C$_6$H$_4$(OCH$_2$CH$_2$)$_2$H, —C$_6$H$_4$(OCH$_2$CH$_2$)$_3$H, —(C$_6$H$_4$O)$_3$C$_3$H$_7$, —CH$_2$CH$_2$OCH$_2$CH$_2$)$_2$H, —CH$_2$CH$_2$(OCH$_2$CH$_2$)$_3$OOCCH$_3$, —CH$_2$CH$_2$OC$_6$H$_5$, —CH$_2$CH$_2$OOCCH$_3$, —CH$_2$CH(CH$_3$)OOCC$_6$H$_5$, —C$_6$H$_4$COOC$_2$H$_5$, —CH$_2$COOC$_6$H$_5$, etc.

The polyimide starting materials used in the process of this invention may be prepared conveniently as shown in U.S. Pat. Nos. 3,897,395 and 4,058,505 by reacting the dianhydride with the diamine in a phenol solvent of the formula:

wherein each $R^I$ is hydrogen or a methyl radical in the presence of certain organic azeotroping agents, particularly cyclic hydrocarbons of 6 to 8 carbon atoms and most preferably benzene or toluene, until most of the water of reaction is eliminated.

The compositions of the present invention have application in a wide variety of physical shapes and forms, including use as films, molding compounds, coatings, etc. The unusual heat stability and resistance to deformation at elevated temperatures in the cured state, makes these compositions especially unique. When used as films or when made into molded products, these polymers, including laminated products prepared therefrom not only possess excellent physical properties at room temperature, but they retain their strength and excellent response to work-loading at elevated temperatures for long periods of time.

Moreover, solutions of the curable compositions herein described can be coated on electrical conductors such as copper, aluminum, etc. and thereafter the coated conductor can be heated at elevated temperatures to remove the solvent and to effect curing of the resinous composition. If desired, an additional overcoat may be applied to such insulated conductors including the use of polymeric coatings such as polyamides, polyesters, silicones, polyvinylformal resins, epoxy resins, polyimides, polytetrafluoro-ethylene, etc.

They can also be used as binders for asbestos fibers, carbon fibers and other fibrous materials in making brake linings. In addition, molding compositions and molded articles may be formed from the polymeric compositions in this invention by incorporating such fillers as asbestos, glass fibers, talc, quartz, powder, wood flour, finely divided carbon, silica, into such compositions prior to molding. Shaped articles are formed under heat, or under heat and pressure in accordance with practices well known in the art. In addition, various heat-resistant pigments and dyes may be incorporated as well as various types of inhibitors, depending on the application intended.

SPECIFIC EMBODIMENT

The practice of this invention is illustrated by the following examples. These examples are given merely by way of illustration and are not intended to limit the scope of the invention in any way nor the manner in which the invention can be practiced. Unless specifically indicated otherwise, parts and percentages are given as parts and percentages by weight.

In those cases where sodium acetate, NaOAc, is used as a catalyst, it is first mixed in a dry condition with the tris-maleimide and blended in a Wig-L-jig apparatus for at least a minute. In the other cases, where DMAC is added to the catalyzed mixture, a capillary is used to add the trace amount of DMAC to the powdered mixture. Then the cover glass containing the sample is placed in the recess in the stage of a Fisher-Johns apparatus preheated initially to about 15° C. above the melting point of the specific tris-maleimide under test.

EXAMPLE I

In a 100 ml three-neck round bottom flask equipped with a magnetic stirrer, condenser and nitrogen inlet is placed 0.606 gm. (0.002 mole) of 2,4-bis(p-aminobenzyl)aniline (BABA) in 15 ml of dimethyl acetamide (DMAC). The solution is warmed to 50° C. and then a solution of 0.392 gm. (0.004 mole) of maleic anhydride in 15 ml of DMAC is added over a period of about 30 minutes with continued stirring. Then a solution of 0.3222 gm. (0.001 mole) of 3,3'4,4'-benzophenonetetracarboxylic acid dianhydride (BTCA) in 10 ml of DMAC is added and the resultant solution is heated at 95°-100° C. for about 45 minutes. Then 22.5 ml (0.24 mole) of acetic anhydride and 0.246 gm. (0.003 mole) of sodium acetate are added and the temperature raised to 85°-90° C. for three hours. After cooling, the reaction mixture is poured onto 200 gm. of ice and water and refrigerated overnight. The solid product is filtered off, washed well with water and vacuum dried at 100° C. By infrared spectrum and elemental analysis, this product is identified as:

0.392 (0.004 mole) of maleic anhydride in 15 ml of m-cresol is added over a period of about one-half hour with continued stirring. The resulting solution is heated at 100° C. for 1 hour, and then a solution of 3,3'4,4'-benzophenonetetracarboxylic acid dianhydride (BTCA) in 10 ml of m-cresol is added. The solution is heated at reflux until no more water is removed as azeotrope. The reaction mixture is cooled and then concentrated on a rotary flash evaporator. The residue is vacuum dried at 150° C. for 30 hours. The residue is then dissolved in 30 ml of m-cresol at 70°-80° C. Then 22.5 ml (0.24 mole) of acetic anhydride and 0.246 gm. (0.003 mole) of sodium acetate are added and the resultant solution maintained with stirring at 70°-80° C. for 4 hours. The product is then precipitated with methanol and washed three times with methanol to yield a composition similar to that described in Example I as verified by infrared spectrum and elemental analysis.

EXAMPLE III

In a 100 ml three-neck round bottom flask equipped with a magnetic stirrer, condenser and nitrogen inlet there is placed 0.606 gm. (0.002) mole of 2,4-bis(p-aminobenzyl)aniline (BABA) in 15 ml of m-cresol. After warming the solution to 50° C., a solution of 0.392 gm. (0.004) mole of maleic anhydride in 15 ml of m-cresol is added over a period of about one-half hour with continued stirring. The resultant solution is heated at 100° C. for 1 hour, and then a solution of 0.3222 gm. (0.001 mole) of 3,3,',4,4'-benzophenonetetracarboxylic acid dianhydride (BTCA) in 10 ml of m-cresol is added. The solution is heated at reflux for about one hour. Then 22.5 ml (0.24 mole) of acetic anhydride and 0.246 gm. (0.003 mole) of sodium acetate are added and the temperature raised to 70°-80° C. for four hours. The product is then precipitated with methanol and washed three times with methanol to yield a product similar to that described in Example I as verified by infrared spectrum and elemental analysis.

EXAMPLE IV (a) Into a 100 ml three-neck round bottom flask equipped with a magnetic stirrer, thermometer, condenser, gas inlet tube, dropping funnel, etc. there is placed under nitrogen atmosphere a solution of ben-

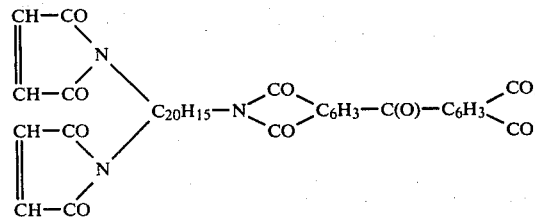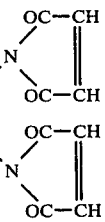

where $C_{20}H_{15}$ represents the residue of 2,4-bis(p-aminobenzyl)aniline and the $C_6H_3C(O)C_6H_3$ radical represents the tetravalent radical from the BTCA. This product fits the generic formulas given above wherein n equals zero. When melt polymerized according to the procedure described above, a sample of this product cures in 30-45 seconds at 350° C.

EXAMPLE II

In a m-cresol:benzene azeotropic apparatus, there is placed 0.606 gm. (0.002 mole) of 2,4-bis(p-aminobenzyl)aniline (BABA) in 15 ml of m-cresol and 10 ml of benzene. After warming the solution to 50° C., a solution of zophenone-tetracarboxylic acid anhydride (BTCA) (6.44 g., 0.02 mole) in 25 ml of dimethylacetamide (DMAC). Then a solution of 4,4'-oxydianiline (ODA) (2.00 g., 0.01 mole) in 15 ml of DMAC is added over a period of 15 minutes. The reaction, which is exothermic, is maintained at 40° C. during the addition, following which it is heated at 85°-90° C. for 15 minutes. To this clear solution, acetic anhydride (3.06 g, 0.03 mole) is added and the mixture is heated to 125° C. Within 15 minutes, a yellow precipitate is formed. After heating the reaction mixture for one hour the solvents are removed in a rotary of flash evaporator. The residual light yellow solid is washed with anhydrous ether and dried in a vacuum oven at 140° C. to afford a quantitative yield. The elemental analysis is found to be for C: 68.3% and for H: 2.4%, which are in good agreement with the calculated values for $C_{46}H_{20}N_2O_{13}$ having the formula:

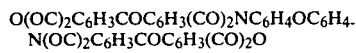

(b) Into the reaction equipment used in (a), there is placed 25 ml of m-cresol, 4.04 gm (0.0012 mole) of the anhydride terminated polyimide of (a), 1.20 gm. (0.0024 mole) of the di(maleic amic acid) derivative of 2,4-bis(p-aminobenzyl)aniline and the mixture is heated at reflux for one hour. Water:methanol (50:50) is added to the precipitate and the product washed several times with this same mixture. The product is isolated by filtration and dried in a vacuum oven at 130°-140° C. to give an almost quantitative yield of 5.20 grams. The elemental analysis is in good agreement with the calculated value for the formula:

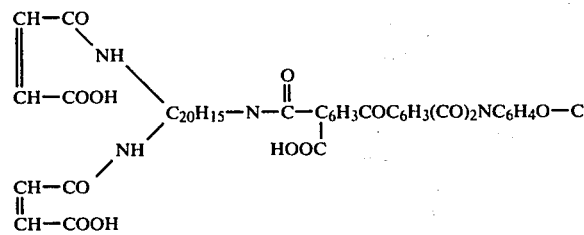 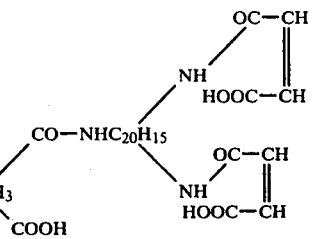

(c) In the equipment of Example I, there is placed 1 gm of the amic acid derivative of above paragraph (b) together with 25 ml of DMAC, 22.5 ml of acetic anhydride and 0.25 ml of sodium acetate. The temperature is raised to 85°-90° C. and maintained there with stirring for three hours. Then, after cooling, the reaction mixture is poured onto 200 gm of ice and water and refrigerated overnight. The solid product is washed well with water and vacuum dried at 100° C. By infrared spectrum and elemental analysis this product is identified as:

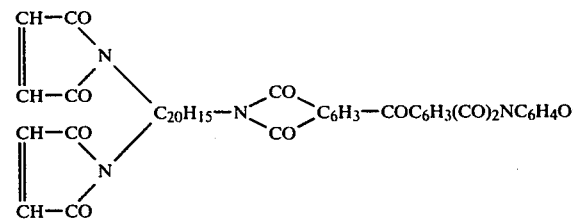 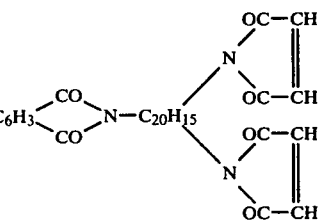

This tetramaleimide product corresponds to the generic Formual I with n having a value of 1, Q representing $C_{20}H_{15}$, the core or residue of 2,4-bis(p-aminophenyl)aniline, Ar representing $-C_6H_4OC_6H_4-$ and Ar" representing $C_6H_3COC_6H_3$.

EXAMPLE V

The procedure of Example IV is repeated except that the amounts of BTCA and ODA are increased to 25.76 gm. (0.08 mole) and 14.0 gm. (0.07 mole) respectively with proportionate increases in the amount of DMAC. The products obtained according to paragraphs (b) and (c) correspond respectively to those in Example IV except that in both cases n has a value of 7.

EXAMPLE VI

The procedure of Example IV is repeated except that the amounts of BTCA and ODA are increased to 38.64 gm. (0.12 mole) and 22.0 gm. (0.11 mole) respectively with proportionate increases in the amount of DMAC. The products obtained according to paragraphs (b) and (c) correspond respectively to those in Example IV except n has a value of 11.

EXAMPLE VII (A) In a 100 ml three-neck round bottom flask equipped with a magnetic stirrer, condenser and nitrogen inlet, there is placed under a nitrogen atmosphere 0.606 gm. (0.002 mole) of 2,4-bis(p-aminobenzyl)aniline (BABA) in 15 ml of m-cresol. After warming the solution to 50° C., a solution of 0.392 gm. (0.004 mole) of maleic anhydride in 15 ml of m-cresol is added over a period of about one-half hour with continued stirring. The resulting solution is heated at 100° C. for 1 hour.

(B) In the meantime an anhydride-terminated polyamic acid is prepared by reacting 1.61 gm. (0.005 mole) of benzophenone-tetracarboxylic acid anhydride (BTCA) and 1.169 gm. (0.004 mole) of 1,3-di(3-aminophenoxy)benzene (DAPB) in 40 ml of m-cresol. This mixture is reacted at 100° C. for one hour. Then the solution produced above according to preceding paragraph (A) is added to this solution and heated at reflux for about one hour. Then 50.62 ml (0.54 mole) of acetic anhydride and 0.55 gm. (0.0067 mole) of sodium acetate is added and the temperature raised to 70°-80° C. for four hours. The product is precipitated with methanol and washed three times with methanol to yield a product identified by infrared and elemental analysis to have the formula:

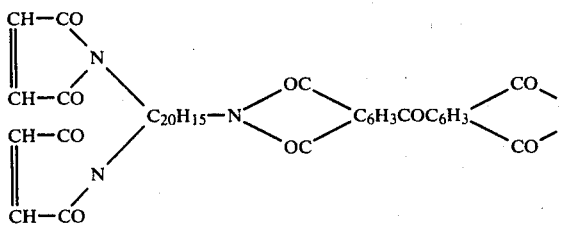

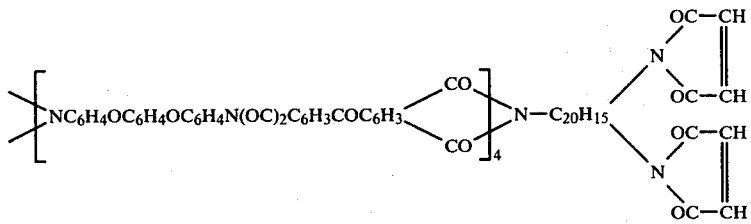

EXAMPLE VIII

The procedure of Example VII is repeated except that the solution of BTCA and DAPB in cresol used in (B) is added directly to the solution produced in (A). Then the mixture is reacted at 100° C. for one hour to produce simultaneously the production of the intermediate polyamic acid portion and the reaction between anhydride and the di(maleic amic acid) derivative of the 2,4-bis(p-aminobenzyl)aniline. Then the acetic anhydride and sodium acetate are added and the temperature raised to 70°-80° C. for four hours to effect ring closure of the amic acid groups to cylic imide groups. The product is precipitated with methanol and washed three times with methanol to yield a product which, according to infrared spectum and elemental analysis, corresponds to that produced in Example VII.

EXAMPLE IX

The procedure of Example I is repeated except that instead of the solution of BTCA there is added a solution of 2.5776 gm. (0.008 mole) of BTCA and 1.40 gm. (0.007 mole) of 4,4'-oxydianiline (ODA) in 25 ml of DMA. The resultant solution is heated at 95°-100° C. for about one hour. Then 62 ml (0.66 mole) of acetic anhydride and 0.68 gm. (0.008 mole) of sodium acetate is added and the temperature raised to 85°-90° C. for four hours. The reaction mixture is further processed as in Example I. The product is identified by infrared spectrum and elemental analysis to have the formula:

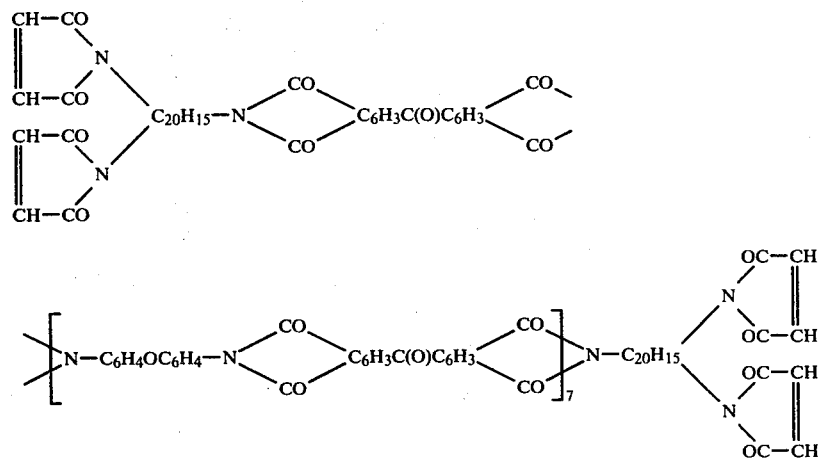

This product fits the generic formula I given above wherein Q represents $C_{20}H_{15}$, the trivalent core or residue of 2,4-bis(p-aminobenzyl)aniline, Ar'' is the tetravalent $>C_6H_3C(O)C_6H_3<$ which is the residue of 3,3',4,4'-benzophenonetetracarboxylic acid dianhydride, Ar is the divalent —$C_6H_4OC_6H_4$— residue of 4,4'-oxydianiline and n=7.

EXAMPLE X

The procedures of Examples I, IV and VII are repeated a number times to produce other tetra-maleimide polyimides of this invention using in place of the BABA, corresponding equivalent amounts respectively of the following triamines:
 a. 1,3,5-triaminobenzene
 b. 1,3,6-triaminonaphthalene
 c. 3,3'5-triaminodiphenyl
 d. melamine
 e. 2,4(p-aminophenylethylidene-1)aniline
 f. 2,3,5-tris(anilino)hexane
 g. p,p',p''-tris(aminophenyl)methane Polymerizations on the respective tetra-maleimide polyimides are conducted satisfactorily as described herein to give hard polymer products which are infusible and solvent resistant.

EXAMPLE XI

A solution is prepared using 5 g. of the tetra-maleimide polyimide prepared in Example I and adding just enough DMAC to make a viscous solution. To this solution is added 0.05 g. of sodium acetate and stirring continued until uniform dispersion is effected. This solution is knife coated onto an asbestos board and heated in an oven at 130° C. for 30 minutes, 170° C. for 30 minutes and 200° C. for one hour. A glossy, continuous film is obtained which is crosslinked, thermally stable, and water and solvent resistant. Similar results are obtained when this procedure is repeated a number of times using in place of this tetra-maleimide polyimide, equivalent amounts respectively of the tetra-maleimides of Examples II-X, respectively.

EXAMPLE XII

The procedure of Example XI is repeated a number of times except that 10% of the tetra-maleimide polyimide is replaced with N-phenyl maleimide. Similar results are obtained except that the film is a little softer. Similar results are also obtained when the procedure is repeated a number of times using, in place of the phenyl maleimide, equivalent amounts respectively of cyclohexyl maleimide, tolyl maleimide, naphthyl maleimide, octyl maleimide, decyl maleimide and diphenyl maleimide. Similar results are obtained when this procedure is repeated a number of times, using in place of this tetramaleimide, equivalent amounts respectively of the tetramaleimides of Example II.

EXAMPLE XIII

The procedure of Example XI is repeated a number of times except that 20% of the tetra-maleimide polyimide is replaced with phenylene dimaleimide, tolylene dimaleimide, naphthylene dimaleimide, ethylene dimaleimide, butylene dimaleimide and cyclohexenyl dimaleimide respectively. Results similar to those in Example XI are obtained. Similar results are obtained when this procedure is repeated a number of times using, in place of this tetra-maleimide polyimides, equivalent amounts respectively of the tetra-maleimide polyimides of Example X.

EXAMPLE XIV

A solution is prepared as in Example III using 5 g. of the tetra-maleimide polyimide of Example I and 5 g. of a maleimide-terminated polyimide prepared as described in Example 4 of U.S. Pat. No. 3,890,272. This polyimide has the formula:

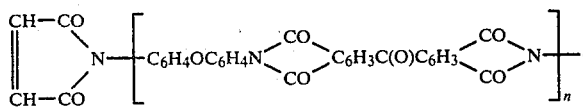

wherein n has a value of 1. When processed and cured as in Example XI, films of excellent properties are obtained.

EXAMPLE XV

The procedure of Example XIV is repeated using a polyimide of the formula given in Example XIV in which n has a value of 4. The resultant film has excellent toughness and heat and solvent resistance properties.

EXAMPLE XVI

The procedure of Example IX is repeated a number of times with very good results using polyimides in which the oxydianiline is replaced in the preparation of the polyimide with an equivalent amount respectively of:
a. 4,4'-diaminodiphenyl methane
b. 4,4'-diaminodiphenyl oxide
c. 4,4'-diaminodiphenyl sulfide
d. 4,4'-diaminodiphenyl sulfone
e. 4,4'-diaminostilbene
f. $H_2NC_6H_4OC_6H_4OC_6H_4NH_2$ Films are obtained of excellent toughness and heat and solvent resistance.

EXAMPLE XVII

The procedure of Example IX is repeated a number of times with very good results using polyimides in which the benzophenone-tetracarboxylic acid dianhydride is replaced in the preparation of the polyimide with an equivalent amount respectively of:
a. pyromellitic dianhydride
b. 2,3,6,7-naphthalene tetracarboxylic acid dianhydride
c. 3,3'4,4'-diphenyl tetracarboxylic acid dianhydride
d. 2,2-bis(3,4-dicarboxyphenyl)ether dianhydride Films of excellent properties are obtained.

EXAMPLE XVIII

A mixture is prepared by grinding in a mortar equal parts of the tetra-maleimide polyimide of Example I and a diacetylene-terminated polyimide having the formula:

$$C_6H_5C\equiv C-C\equiv CC_6H_4-N(OC)_2C_6H_3COC_6H_3(-CO)_2[NC_6H_4OC_6H_4N(OC_2)-C_6H_3OC_6H_3-(CO)_2]_4N-C_6H_4C\equiv C-C\equiv CC_6H_5$$

This polyimide diacetylene derivative is prepared according to the procedure of Examples IV and V of application Ser. No. 199,604 filed Oct. 22, 1980. The intimate mixture of these two materials is placed in a steel mold and heated at 275°-300° for 15 minutes to give an insoluble, infusible addition product of improved properties with regard to toughness and heat and solvent resistance.

The foregoing procedure is repeated three times using the same tetra-maleimide polyimides and as the second component an equal amount of:
a. The same polyimide as above except that the two terminal groups are $CH\equiv C-C\equiv CC_6H_4-$;
b. The same polyimide as above except that the two terminal groups are $CH_2=CH-C\equiv CC_6H_4-$;
c. The same polyimide as above except that the two terminal groups are $CH_2=CH-CH=CH-$.

Similar improved results are obtained in the molded products.

EXAMPLE XVIII

A number of solutions are prepared using 20% by weight of monomer in dimethylacetamide (DMA) in which the tetra-maleimide polyimide (TMP) of Example I is used along or in combination with comonomers identified as follows:
a. 100% TMP
b. 890% TMP plus 20% styrene
c. 80% TMP plus 10% acrylonitrile
d. 90% TMP plus 10% methyl methacrylate
e. 50% TMP plus 50% styrene To each of these solutions is added 1% by weight of benzoyl peroxide based on the weight of monomer and maintained at 95°–105° C. for three hours. In each case an insoluble, infusible polymer is obtained having good physical properties.

In addition to the polymerizations described above, the tetramaleimide polyimides of this invention may be polymerized or cured by various methods including those described in U.S. Pat. No. 3,929,715. The polyimides of this invention give faster curing and harder products then obtained with the bismaleimides of that patent.

Thus, polymerization may be effected by mixing with sodium acetate in a dry condition and blending in a Wig-L-jig apparatus for at least a minute. Heating such a mixture at 160° C., preferably in the absence of air, produces a hard polymer product in less than 10 minutes. In place of the sodium acetate there may be used sodium carbonate, sodium cyanide or other alkali metal salt of a Bronsted acid as defined above.

An activator for polymerization may be an aprotic solvent such as 0.01 to 5% by weight based on the weight of the polyimide of dimethyl acrylamide, dimethyl formamide and other aprotic organic compounds as defined in the aforesaid patent.

While certain features of this invention have been described in detail with respect to various embodiments thereof, it will of course be apparent that other modifications can be made within the spirit and scope of this invention and it is not intended to limit the invention to the exact details insofar as they are defined in the following claims.

The invention claimed is:
1. A tetra-maleimide polyimide having the formula:

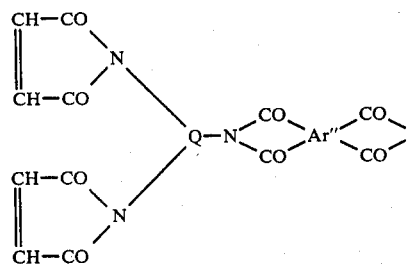

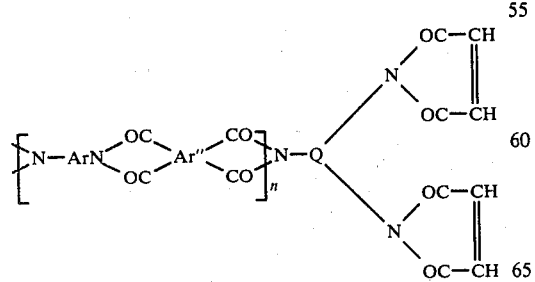

wherein
Q is a trivalent aromatic radical;

Ar" is a tetravalent aromatic radical, the four carbonyl groups being attached directly to separate carbon atoms of said aromatic radical and each pair of carbonyl groups being attached to adjacent carbon atoms or peri carbon atoms in Ar";
Ar is a divalent aromatic radical; and
n is zero or an integer having a value of 1–20.

2. The polyimide of claim 1, in which Q represents the radical >C$_6$H$_3$—.

3. The polyimide of claim 1, in which Q represents the radical >C$_{10}$H$_5$—.

4. The polyimide of claim 1, in which Q represents the radical:

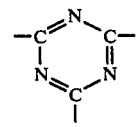

5. The polyimide of claim 1, wherein each N atom attached to Q is attached directly to a separate benzenoid radical in Q.

6. The polyimide of claim 1, in which Q has the formula:

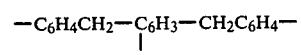

—C$_6$H$_4$CH$_2$—C$_6$H$_3$—CH$_2$C$_6$H$_4$—

7. The polyimide of claim 1 in which Q has the formula:

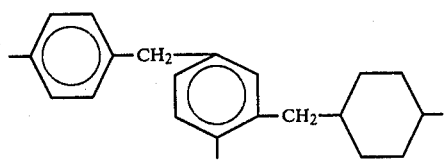

8. The polyimide of claim 7, in which Ar" is a radical selected from the class consisting of:

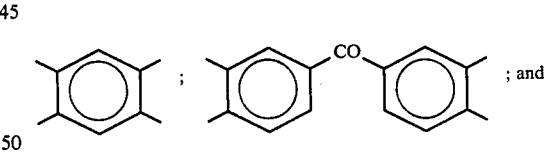
; and

9. The polyimide of claim 7, in which Ar" is

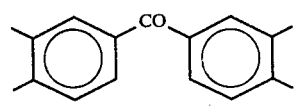

10. The polyimide of claim 1, in which the Ar is derived from a diamine selected from the class consisting of:
1,3- and 1,4-(NH$_2$)$_2$ benzene:
2,3-; 2,5-; 2,6- and 3,5-(NH$_2$)$_2$-toluene 3,3'-; 4,4'- and 3,4'-methylene dianiline
4,4'-; 3,3'- and 3,4'-oxydianiline;
4,4'-; 3,3'- and 3,4'-sulfonyldianiline;
1,3-; 1,4- and 1,2-bis(3-aminophenoxy)benzene;
1,3- and 1,4-bis(4-aminophenoxy)benzene; and
H$_2$NC$_6$H$_4$OC$_6$H$_4$SO$_2$C$_6$H$_4$OC$_6$H$_4$SO$_2$C$_6$-H$_4$OC$_6$H$_4$NH$_2$ in which the respective attachments to a C$_6$H$_4$ ring are meta or para to each other.

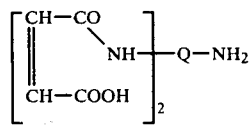

with an amic acid anhydride of the formula:

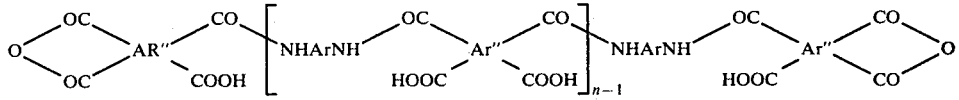

11. The polyimide of claim 10, in which the Ar is derived from a methylene dianiline.

12. The polyimide of claim 10, in which the Ar is derived from a sulfonyl dianiline.

13. The polyimide of claim 10, in which the Ar is derived from an oxydianiline.

14. The polyimide of claim 10, in which the Ar is derived from 2,4-toluene diamine.

15. The process of preparing a polyimide of claim 1, which comprises reacting a maleamic acid amine of the formula:

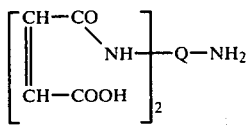

with an anhydride of the formula:

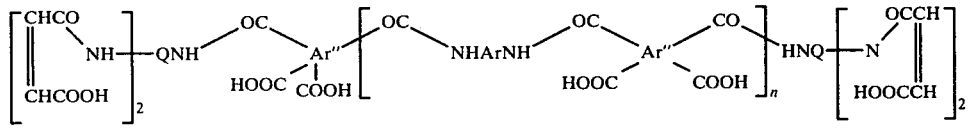

wherein Q, n, Ar and Ar" are the same as defined in claim 1, said amine being used in a proportion of about two molar equivalents per molar equivalent of said anhydride and thereafter effecting ring closure of the amic acid groups in the intermediate produced thereby said ring closure being effected at a temperature of approximately 60°–100° C.

16. The amic acid intermediate obtained in the process of claim 15, having the formula:

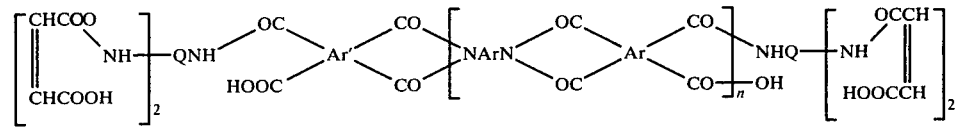

17. The process of preparing a polyimide of claim 1 which comprises reacting an amine of the formula:

wherein Q, n, Ar and Ar" are as defined in claim 1, said amine being used in a proportion of about two molar equivalents per molar equivalent of said anhydride and thereafter effecting ring closure of the amic acid groups in the intermediate produced thereby said ring closure being effected at a temperature of approximately 60°–100° C.

18. The process of preparing the tetra-maleimide polyimide of claim 1, comprising the steps of heating a mixture of two molar equivalents of the di(maleamic acid) derivative of an aromatic triamine with n+1 molar equivalents of an aromatic tetracarboxylic acid dianhydride and n molar equivalents of an aromatic diamine to produce an intermediate amic acid derivative, and thereafter effecting ring closure on said amic acid groups to produce the tetramaleimide polyimide product.

19. The amic acid intermediate obtained in the process of either of claims 17 or 18 having the formula:

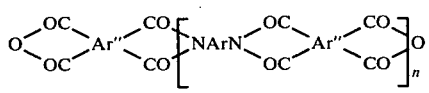

wherein Q, n, Ar and Ar" are as defined in claim 1.

20. The process of any of claims 15, 17 or 18 in which the ring closure of said amic acid intermediate is effected in the presence of an anhydride of a monocarboxylic acid of 2–5 carbon atoms and an anhydrous alkali metal salt of such a monocarboxylic acid.

21. The process of claim 20, in which said anhydride is acetic anhydride and said salt is sodium acetate.

22. An addition polymerization product of the tetra-maleimide polyimide of claim 1.

23. An addition copolymerization product of the tetra-maleimide polyimide of claim 1, with a compound having at least one CH$_2$=CH— or CH$_2$=C(CH$_3$)— radical therein.

24. The addition product of the tetra-maleimide polyimide of claim 1, with a compound having at least one conjugated diyne group therein the addition being effected between the —CH=CH— of the maleimide group and yne group of the conjugated diyne compound.

25. The addition product of the tetra-maleimide polyimide of claim 1, with a compound having at least one conjugated diene group therein the addition being effected between the —CH=CH— of the maleimide and the conjugated diene of the conjugated diene compound.

26. The addition product of the tetra-maleimide polyimide of claim 1, with at least one compound having at least one conjugated enyne group therein the addition being effected between the —CH=CH— of the maleimide and the conjugated enyne group of the conjugated enyne compound.

27. The product of any of claims 22, 23, 24, 25 or 26 in which said tetra-maleimide is the tetra-maleimide of the triamine 2,4-bis(p-aminobenzyl)aniline with the three amino-nitrogens of the original triamine being the respective nitrogen atoms in the respective imide structures of the maleimide.

* * * * *

UNITED STATES PATENT AND TRADEMARK OFFICE
CERTIFICATE OF CORRECTION

PATENT NO. : 4,418,181  
DATED : Nov. 29, 1983  
INVENTOR(S) : Walter J. Monacelli Page 1 of 2

It is certified that error appears in the above-identified patent and that said Letters Patent is hereby corrected as shown below:

In the ABSTRACT, in the first section of the formula, change "AR' " to "Ar" "; in the second section of the formula, change "AR" " to "Ar" "; and in the second section of the formula insert a line between "N              to give "N  
   CO"                     CO" ;

Col. 2, line 58, change "(Reacti " to "(Reaction 2)";

Col. 5, lines 15-18, insert 3rd valence line in

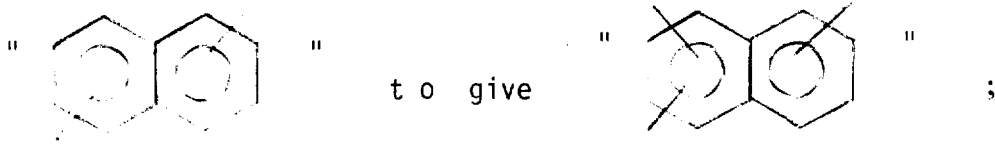

to give     ;

cont'd. next sheet

UNITED STATES PATENT AND TRADEMARK OFFICE
CERTIFICATE OF CORRECTION

PATENT NO. : 4,418,181
DATED : Nov. 29, 1983
INVENTOR(S) : Walter J. Monacelli

It is certified that error appears in the above-identified patent and that said Letters Patent is hereby corrected as shown below:

Col. 9, lines 34-36, insert 3rd and 4th valence lines in

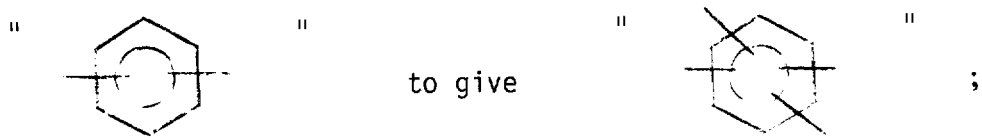 to give ;

Col. 15, line 1, change "of" to "or";

Col. 17, lines 5-7, insert slanted line between

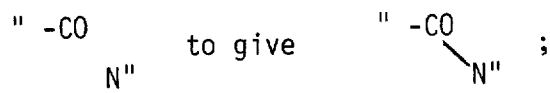 to give ;

Col. 18, line 65, change "on" to "of";

Signed and Sealed this

Fourteenth Day of February 1984

[SEAL]

Attest:

GERALD J. MOSSINGHOFF

Attesting Officer   Commissioner of Patents and Trademarks